United States Patent [19]

Okamoto et al.

[11] 4,442,369
[45] Apr. 10, 1984

[54] ROTOR OF A SUPERCONDUCTIVE ROTARY ELECTRIC MACHINE

[75] Inventors: Kouichi Okamoto, Kobe; Masaki Sakuyama, Ashiya; Mitsuo Tanaka, Ibaragi, all of Japan

[73] Assignee: Mitsubishi Denki Kabushiki Kaisha, Tokyo, Japan

[21] Appl. No.: 388,733

[22] Filed: Jun. 15, 1982

[30] Foreign Application Priority Data

Jun. 22, 1981 [JP] Japan .................. 56-98890

[51] Int. Cl.³ .............................. H02K 3/48
[52] U.S. Cl. ............................. 310/214; 310/45; 310/52; 310/270
[58] Field of Search ............ 310/10, 52, 61, 64, 310/214, 261, 270, 215, 43, 45

[56] References Cited

U.S. PATENT DOCUMENTS

| 4,239,998 | 12/1980 | Hakamada | 310/215 |
| 4,368,399 | 1/1983 | Ting | 310/270 |

FOREIGN PATENT DOCUMENTS

| 31-46706 | 5/1956 | Japan | 310/52 |
| 51-150402 | 12/1976 | Japan | 310/52 |
| 54-113808 | 9/1979 | Japan | 310/52 |
| 57-13961 | 1/1982 | Japan | 310/52 |

Primary Examiner—R. Skudy
Attorney, Agent, or Firm—Wenderoth, Lind & Ponack

[57] ABSTRACT

The present invention consists in that insulating fillers on the sides of superconductive field coils disposed on a coil-carrying shaft in the rotor of a superconductive rotary electric machine are separated into padding plates mounted so as to cover all the sides of the superconductive field coils, and the other portions, thereby to prevent the damage of the insulation between the turns of the field coils and to firmly fix the field coils.

1 Claim, 7 Drawing Figures

ROTOR OF A SUPERCONDUCTIVE ROTARY ELECTRIC MACHINE

BACKGROUND OF THE INVENTION

The present invention relates to a structure of the rotor of a superconductive rotary electric machine.

Heretofore, a rotor of this type has been as shown in FIG. 1. In FIG. 1, reference numeral 1 denotes torque tubes; a coil-carrying shaft 2 forms the central portion of the torque tubes 1; superconductive field coils 3 are mounted on the coil-carrying shaft 2; a normal temperature damper in the shape of an outer housing encloses the torque tubes 1 and the coil-carrying shaft 2; a low temperature damper 5 is disposed between the normal temperature damper 4 and the coil-carrying shaft 2; a helium containing cylindrical outer wall 6 is disposed on the outer periphery of the coil-carrying shaft 2 and helium end plates 7 are disposed at the ends of the shaft 2 respectively; a driving and driven end shafts 8 and 9 are at the opposite ends of the shaft 2 respectively; bearing 10 support the end shaft 8 and 9; slip rings 11 supply the field current to the coils 3; a heat exchanger 12 is provided in the torque tubes 1; side radiation shields are provided adjacent helium end plates 7 defining a vacuum space 14; and a liquid helium container 15 is provided within shaft 2.

In an arrangement of the rotor of the superconductive rotary electric machine, the superconductive field coils 3 mounted on the coil-carrying shaft 2 are cooled below the transition temperature in the neighbourhood of a few degrees above absolute zero. Thus the electrical resistance becomes vanishingly small so that large magnetic fields are established without the expenditure of appreciable amounts of electrical energy. Under such conditions alternating electrical power is generated in a stator (not shown). Liquid helium is supplied to the helium container 15 defined by the outer wall 6 and end plates 7 through a conduit (not shown) in the shaft 9 for cooling the superconductive field coils 3 to minimum temperatures, while the vacuum spaces 14 within the rotor are kept at a vacuum. The torque tubes which transmit the rotary torque to the superconductive field coils 3 and the coil-carrying shaft 2 are in the form of a thin-walled hollow cylinder and the heat exchanger 12 is provided so that outside heat entering into the super-low temperature portion through the torque tubes 1 is substantially reduced. Such an arrangement is common. Furthermore the side radiation shields 13 are provided for reducing the entering heat due to the radiation from the side.

On the other hand, the normal and low temperature dampers 4 and 5 shield the high frequency magnetic fields generated in the stator (not shown) and protect the superconductive field coils 3 therefrom. The dampers 4 and 5 have the further functions of attenuating the vibration of the rotor caused by the perturbations of the electrical system. The normal temperature damper 4 also functions as the outer cylinder of the vacuum space 14, and the low temperature damper 5 functions as the radiation shield which prevents radiation heat from entering into the helium container 15. It should be noted that in FIG. 1, the piping within the rotor for supplying liquid helium to the containers 15 and for exhausting helium therefrom, and the means for supplying and exhausting helium to and from the rotor are omitted.

It is of paramount importance to securely mount the coils on the rotor, for the displacement of the superconductive field coils due to the movement of the rotor may generate frictional heat which destroys the superconductivity of the field coils. It is apparent from FIG. 1 that the checking and repairing of the superconductive field coils 3 is difficult to carry out since the field coils 3 are triple-enclosed by the outer wall 6, and low temperature and normal dampers 5 and 4. In particular the superconductive magnetic field coils 3 should be securely mounted since a rotary electric machine requires high reliability.

To fulfill such requirement, there has been proposed a structure as shown in FIG. 2 wherein grooves are provided in the surface of the coil-carrying shaft to receive the superconductive field windings therein.

In FIG. 2 showing a general arrangement for supporting the field coils 3, reference numeral 2 denotes the coil-carrying shaft; grooves 17 are formed in an axial direction on the surface of the coil-carrying shaft 2; the superconductive magnetic field coils 3 are in the grooves 17; insulators 18 are provided in the grooves; wedges 19 hold the superconductive field coils 3 in the grooves 17; and insulators are provided for the wedges.

In FIG. 2, the superconductive magnetic field coils 3 are wound around the line B—B, and thus a strong magnetic field is established which has a polar axis corresponding to the line B—B.

The wedges 19 are fitted in the grooves 17 to firmly hold the superconductive magnetic field coils 3 therein.

There are however the following disadvantages in the fabrication of the rotor in such arrangement since the ends of the superconductive magnetic field coils 3 are also held in the grooves by the wedges.

FIG. 3 is a perspective view showing one end of the coil-carrying shaft 2. In this figure, reference numeral 2 denotes the coil-carrying shaft; 19 the wedges for the straight portions of the superconductive magnetic field coils 3; and 191 the wedges for the ends of the superconductive magnetic field coils 3. It is apparent from the FIG. 3 that the wedges 191 should have a curved cross-section since the end portions of the superconductive magnetic field coils 3 are curved to run in the circumferential direction of the coil-carrying shaft 2. Furthermore the grooves under the curved wedges 191 have the form of portions of an annulus, which is impossible to machine lathe. The fact that the end portions of the wedges 191 and the grooves have more complicated forms in comparison to the straight portions of the superconductive magnetic field coils 3 not only results in an increase in the time and cost required in machining, but also reduces the precision thereof, thereby endangering the secureness of the mounting of the superconductive field coil 3 on the coil-carrying shaft 2.

In order to overcome the disadvantages of such structure, a proposal as shown in FIG. 4 has been made.

The figure illustrates one end of the coil-carrying shaft 2 in FIG. 1, namely the end carrying the end portions of the superconductive magnetic field coils 3. Reference numeral 2 denotes the coil-carrying shaft having a circumferential recess therein; 3 the superconductive magnetic field coils in the recess; 16 keeper sleeves; 21 an electrically insulating layer; 22 an insulating cover; and 23 electrically insulating fillers.

FIG. 5 is a perspective view showing the end of the coil-carrying shaft 2 for an easy understanding of FIG. 4. Like numerals represent like parts.

In FIGS. 4 and 5, the superconductive field coils 3 are accommodated in the recessed portion of the coil-carrying shaft 2 and the spaces between the coils 3 and between the coils and the ends of the recess are filled by the fillers 23. The keeper sleeves 16 are tightly fitted around the coil-carrying shaft 2 by the shrink fit method to press against the entire periphery of the shaft 2 so that the field coils 3 are very firmly kept in the correct positions.

The conventional electrically insulating fillers 23 which extend in the axial and circumferential directions of the coil-carrying shaft 2 but the ends of the recess in the shaft 2 as shown in FIGS. 4 and 5. Accordingly the following problems are encountered when the electrically insulating fillers 23 are inserted into gaps between the superconductive magnetic field coils 3 and into gaps between the superconductive field coils 3 and the ends of the recess in the coil-carrying shaft 2.

One superconductive magnetic field coil 3 comprises a plurality of turns. The turns are electrically insulated from each other. The electric insulation is in the form of electrically insulating tapes wound on the coil conductors in a spiral manner. The insulating tapes are subject to insulation-breakdown when the insulating fillers 23 are inserted. The insulation breakdown of the tapes between turns of the coil may cause short circuiting of the coils, resulting in the stopping of the operation of the rotary machine. When the gaps between the insulating fillers 23 and the superconductive field coils 3 at the outer periphery thereof are smaller than those at the inner periphery, the gaps are formed between under side face of the superconductive field coils 3 and the insulating fillers 23, resulting in loose fitting of the under portion of the superconductive fiedl coil 3. In such circumstances, the superconductive field coils are displaced due to the electromagnetic and centrifugal forces during the operation so that the frictional heat is generated, which may hinder the operation of the rotary electric machine.

SUMMARY OF THE INVENTION

The present invention has been made in order to overcome the disadvantages of the prior-art structures, and has for its object to provide a rotor of a superconductive rotary electric machine in which insulating fillers are constituted by a plurality of padding plates mounted so as to cover all the side surfaces of superconductive field coils, and the other portions, thereby to prevent the damage of the insulation between the turns of the field coils and to firmly fix the field coils so as to ensure stable operations.

BRIEF DESCRIPTION OF THE DRAWINGS

In the drawings, like reference numerals and characters represent like or corresponding parts.

DESCRIPTION OF THE PREFERRED EMBODIMENTS

Figure 1:
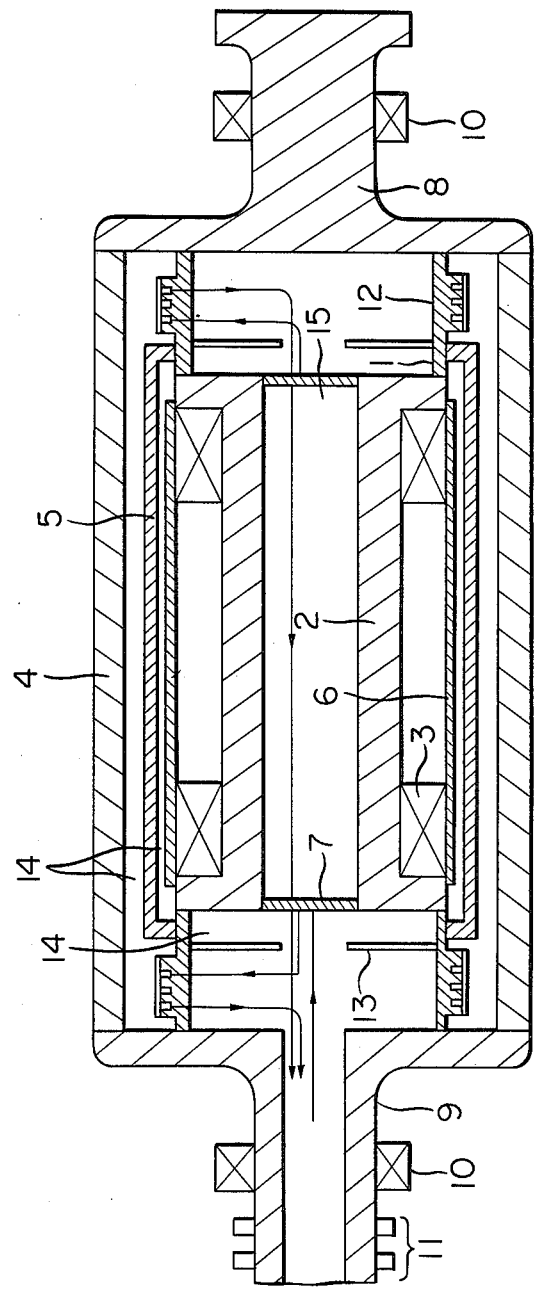
FIG. 1 is an axial sectional view of a conventional structure of the rotor of a superconductive rotary electric machine.
Figure 2:
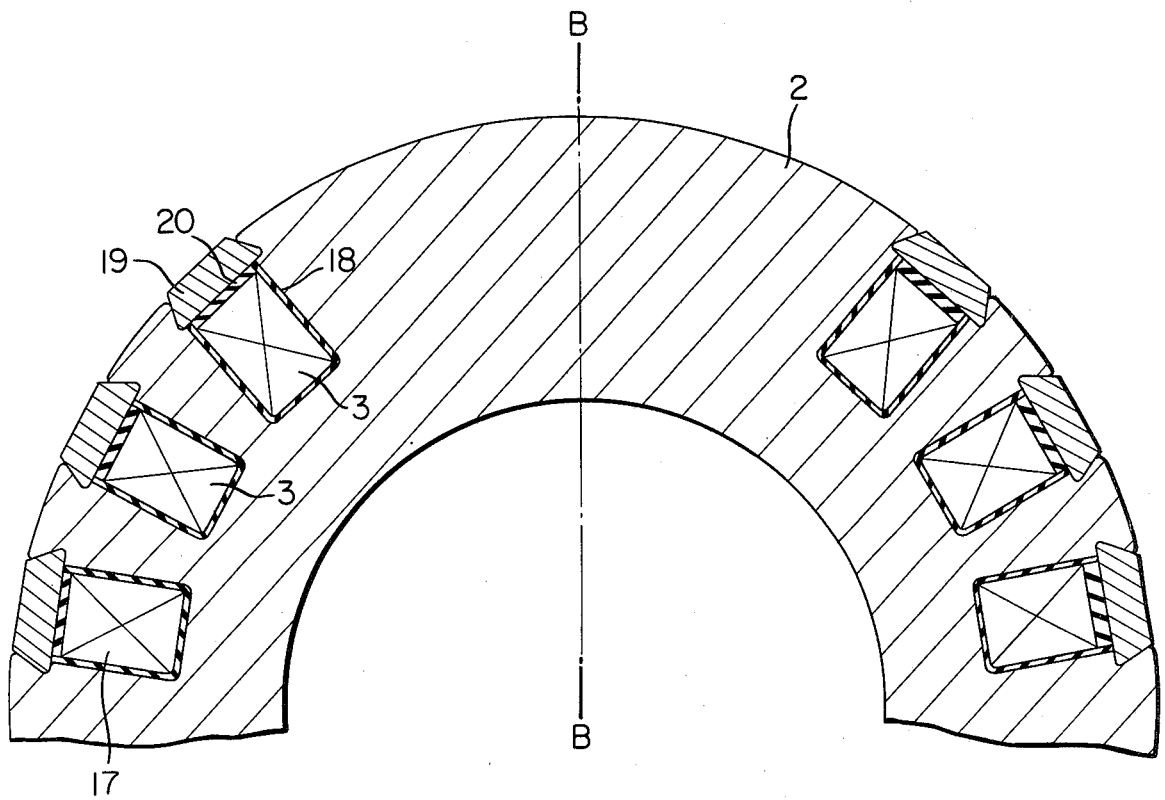
FIG. 2 is a transverse sectional view showing the mounting of field coils.
Figure 3:
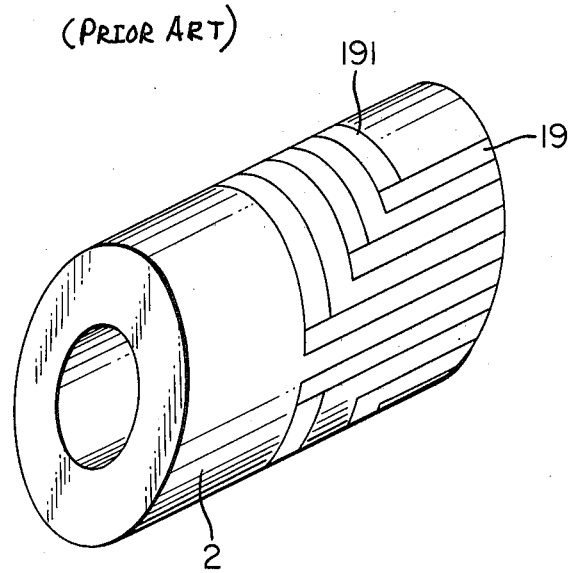
FIG. 3 is a perspective view for explaining the disadvantages of the mounting structure shown in FIG. 2.
Figure 4:
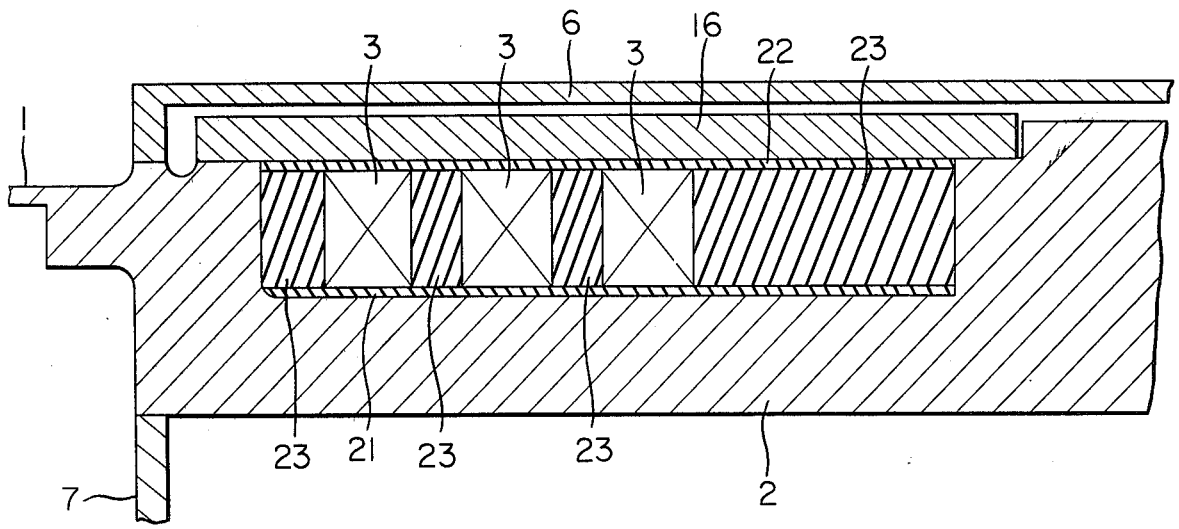
FIG. 4 is an enlarged axial sectional view of the end structure of field coils in a prior-art rotor.
Figure 5:
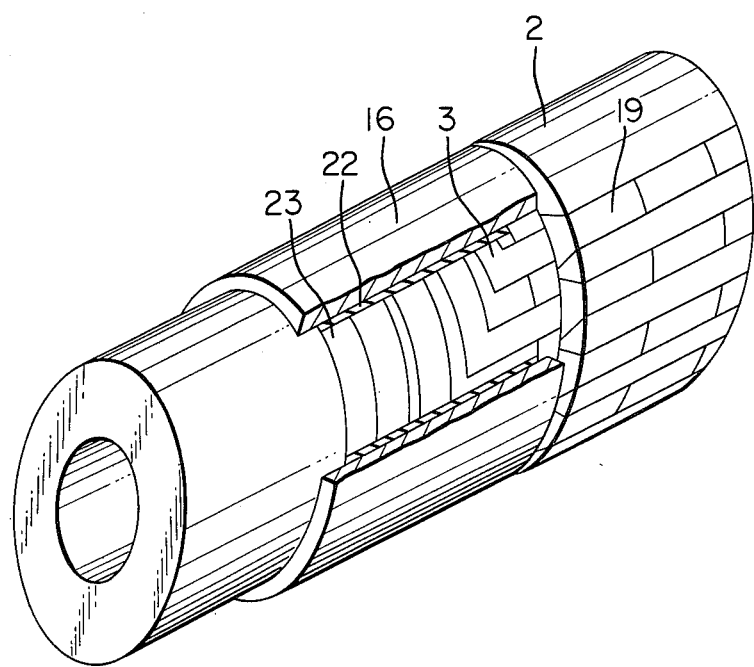
FIG. 5 is a perspective view, partly broken away, for explaining the structure shown in FIG. 4.
Figure 6:
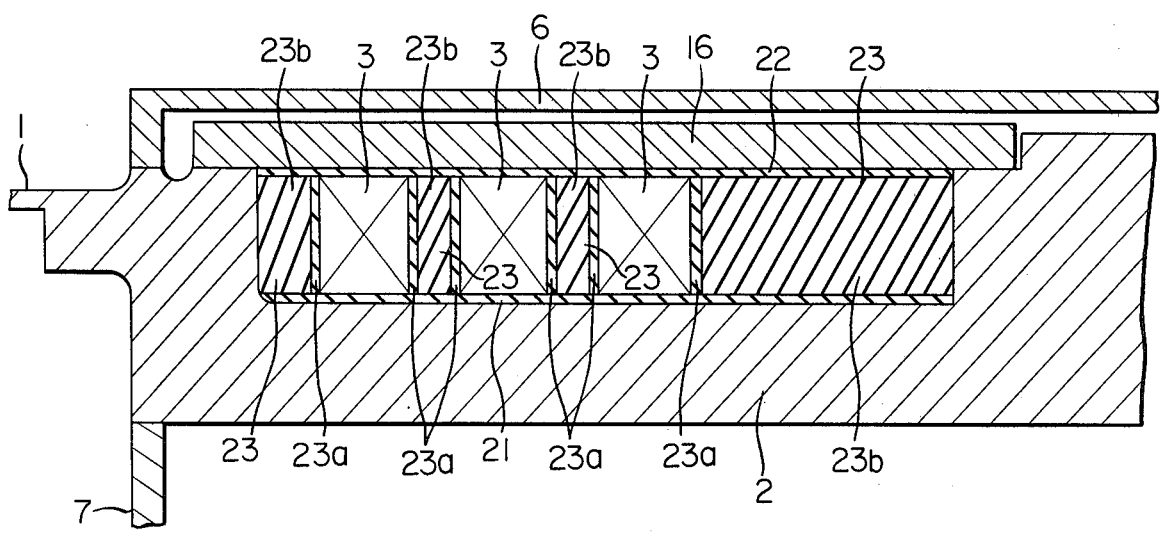
FIG. 6 is an enlarged axial sectional view of an embodiment of the structure of a rotor according to the present invention.

FIG. 6 shows an embodiment of the present invention, in which symbol 23a designates padding plates which cover all the sides of the superconductive field coils and symbol 23b the fillers.

With the above construction, after the superconductive field coils 3 have been mounted on the coil-carrying shaft 2, the sides of the superconductive field coils 3 are covered by the insulating padding plates 23a, then the insulating fillers 23b are inserted. The superconductive field coils 3 are firmly secured without breaking the insulation between respective turns of the superconductive fields coils 3 as can occur in prior art method of the assembly.

Figure 7:
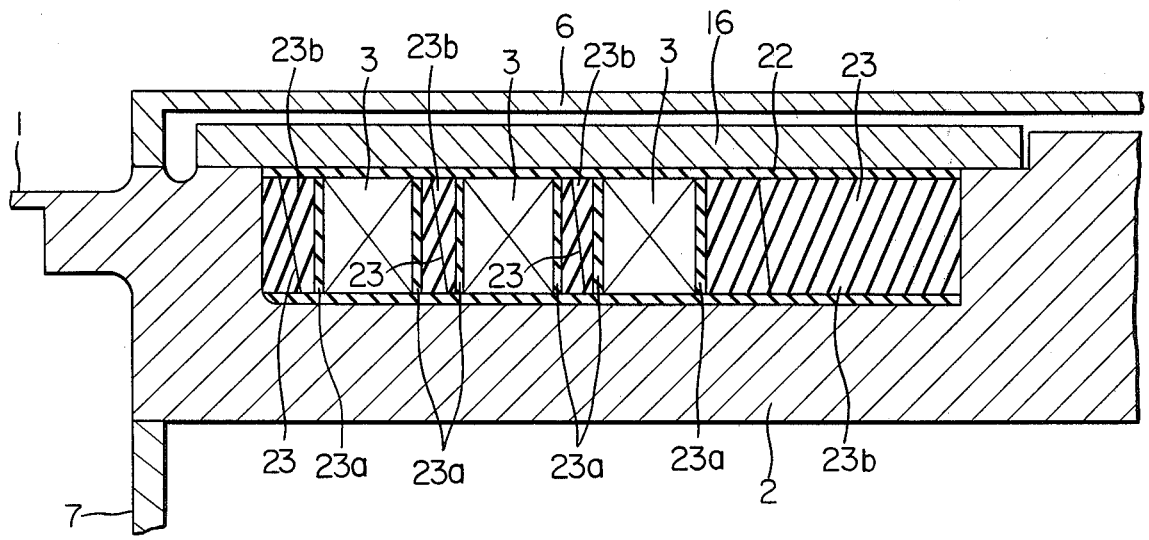
FIG. 7 is a view similar to FIG. 6 of another embodiment of the structure of a rotor according to the present invention.

When the insulating fillers 23b are a pair of complementary wedge-shaped filler portions as shown in FIG. 7, the field coils 3 can be fixed more firmly, and the reliability is enhanced still more.

As set forth above, the present invention can provide a rotor of a superconductive rotary electric machine in which the insulating and filling means for fixing the superconductive field coils are constituted by padding plates for covering all the sides of the field coils, and the fillers, thereby preventing the damage of the insulation between the turns of the field coils and firmly fixing the field coils so as to ensure stable operations and high reliability.

What is claimed is:

1. A rotor for a superconductive rotary electric machine, comprising:
   a coil carrying shaft;
   a plurality of superconductive magnetic field coil means mounted on said coil carrying shaft and having coil end portions which are curved along the circumference of an end portion of the coil carrying shaft, said coil end portions being spaced in the direction of the length of said shaft to define gaps between the coil end portions;
   electrically insulating padding plate means positioned against the side surfaces of said coil end portions on opposite sides of said gaps; and
   electrically insulating filler means filling the remainder of said gaps between said padding plate means, said filler means being a pair of filler portions which have a cross-sectional shape of complementary wedges and filling the space in each gap between the padding plate means.

* * * * *